US012627070B2

(12) United States Patent
Ingelhag et al.

(10) Patent No.: US 12,627,070 B2
(45) Date of Patent: May 12, 2026

(54) ASSYMETRIC ANTENNA-IN-PACKAGE FOR USE IN MULTIPLE POLARIZATIONS

(71) Applicant: Telefonaktiebolaget LM Ericsson (publ), Stockholm (SE)

(72) Inventors: Per Ingelhag, Alingsås (SE); Magnus Nilsson, Lund (SE); Agneta Ljungbro, Bjärred (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/708,495

(22) PCT Filed: Nov. 9, 2021

(86) PCT No.: PCT/EP2021/081095
§ 371 (c)(1),
(2) Date: May 8, 2024

(87) PCT Pub. No.: WO2023/083435
PCT Pub. Date: May 19, 2023

(65) Prior Publication Data
US 2025/0015512 A1 Jan. 9, 2025

(51) Int. Cl.
*H01Q 1/22* (2006.01)
*H01Q 21/00* (2006.01)
(Continued)

(52) U.S. Cl.
CPC ......... *H01Q 21/061* (2013.01); *H01Q 1/2283* (2013.01); *H01Q 25/001* (2013.01); *H01Q 23/00* (2013.01)

(58) Field of Classification Search
CPC ........ H01Q 1/22; H01Q 1/2283; H01Q 21/00; H01Q 21/0025; H01Q 21/06;
(Continued)

(56) References Cited

U.S. PATENT DOCUMENTS 10,826,197 B2 11/2020 Yu et al.
10,854,994 B2 * 12/2020 Niroo Jazi ........... H01Q 1/2283
(Continued)

FOREIGN PATENT DOCUMENTS

EP 3 696 909 A1 8/2020
JP 04025154 A 1/1992
WO 2020/241271 A1 12/2020

OTHER PUBLICATIONS

International Search Report and Written Opinion dated Jul. 4, 2022 in International Application No. PCT/EP2021/081095 (12 pages).

*Primary Examiner* — Tho G Phan
(74) *Attorney, Agent, or Firm* — Rothwell, Figg, Ernst & Manbeck, P.C.

(57) ABSTRACT

An Antenna-in-Package. (AiP: 100) is provided, including an array antenna (120) with antenna elements (122), control ICs (130), and AiP contacting elements (140). Each antenna element is configured for transmitting radio signals having a first polarization (pi) and receiving radio signals having a second polarization (p2). The antenna elements are arranged equidistantly spaced in a rectangular, planar lattice at a first side (112) of the AiP. The AiP is rectangular, and the lattice is shifted towards a first corner (116*a*) of the AiP. An AiP pair assembly, an AiP quartet assembly, an AiP multi-assembly (all including two or more such AiPs), a network node, as well as a method of operating such an AiP quartet assembly or AiP multi-assembly, are also provided.

17 Claims, 5 Drawing Sheets

(51) Int. Cl.
*H01Q 21/06* (2006.01)
*H01Q 25/00* (2006.01)
*H01Q 23/00* (2006.01)

(58) Field of Classification Search
CPC ...... H01Q 21/061; H01Q 21/26; H01Q 23/00; H01Q 25/00; H01Q 25/001
See application file for complete search history.

(56) References Cited

U.S. PATENT DOCUMENTS

| | | | | |
|---|---|---|---|---|
| 11,146,323 | B2 * | 10/2021 | Apaydin | H01Q 21/061 |
| 11,309,638 | B1 * | 4/2022 | Rodriguez De Luis | H01Q 19/108 |
| 11,936,124 | B2 * | 3/2024 | Mathews | H01Q 21/065 |
| 12,394,882 | B2 * | 8/2025 | Goden | H01Q 23/00 |
| 2016/0146931 | A1 | 5/2016 | Rao et al. | |
| 2019/0363457 | A1 | 11/2019 | Chen et al. | |
| 2023/0361484 | A1 | 11/2023 | Komura | |

* cited by examiner

ASSYMETRIC ANTENNA-IN-PACKAGE FOR USE IN MULTIPLE POLARIZATIONS

CROSS REFERENCE TO RELATED APPLICATIONS

This application is a 35 U.S.C. § 371 National Stage of International Patent Application No. PCT/EP2021/081095, filed 2021 Nov. 9.

TECHNICAL FIELD

The present disclosure relates to the field of high-frequency communication. In particular, the present disclosure relates to a so-called Antenna-in-Package (AiP) integrating both array antenna elements and driving circuits for enabling such communication.

BACKGROUND

Array antennas are believed to form a major part of both present and future communication and sensing technologies, such as for example in fifth generation (5G), and sixth generation (6G), mobile communication systems. Especially in high-frequency applications, such as for e.g. 6G bands at 100 GHz or more, the use of low-loss interconnects between e.g. antenna elements in an array antenna and various driving circuits becomes more important. This makes so called Antenna-in-Packages (AiPs) suitable candidates, as they offer to integrate both the antenna elements and the various driving circuits (such as e.g. low-noise amplifiers, LNAs, and power amplifiers, PAs) in a single package.

Due to various manufacturing constraints (such as e.g. limited wafer sizes available for production, yield loss and board level reliability), both the sizes of the AiPs that can be manufactured and the number of antenna elements that can be fit into a single AiP are however limited. For example, building larger array antenna matrices than 8×8 in a single AiP can be both difficult and costly.

A common solution to build an array antenna is to use dual polarized antenna elements together with an RF frontend including an LNA, a PA and an antenna switch. In such a configuration, each antenna element can be configured (using the antenna switch) to alternately receive and transmit both in a horizontal and in a vertical polarization. However, the antenna switch adds losses, and the limited building area and high heat dissipation can be challenging. By splitting the array antenna over two AiPs, where one AiP is hardwired and used to e.g. only receive in the vertical polarization and transmit in the horizontal polarization, while the other AiP is hardwired and used to e.g. receive only in the horizontal polarization and transmit in the vertical polarization, can address the above problem. This because in such a configuration, the antenna switch is no longer required, the available building area is doubled, and the heat dissipation per area is halved, at the expense of doubling the required overall area for the array antenna.

However, in the above configuration using two AiPs, it should be noted that as the two AiPs are not identical and need to be e.g. differently wired internally, manufacturing and provisioning of two different AiPs are needed.

SUMMARY

To avoid the above need to manufacture and provision two different variants of AiPs in order to create an array antenna having the functionality discussed above, the present disclosure provides an improved AiP, various assemblies of two or more such AiPs, a network node, and a method of operating an assembly of two or more such AiPs as defined in the accompanying independent claims. Various alternative embodiments of the AiP and assemblies are defined in the dependent claims.

According to a first aspect of the present disclosure, an Antenna-in-Package (AiP) is provided. The AiP includes an array antenna including a plurality of antenna elements configured for transmitting and receiving radio signals. The AiP further includes one or more integrated circuits configured for controlling the radio signals. The AiP further includes a plurality of AiP contacting elements electrically connected to the one or more ICs. The antenna elements are arranged equidistantly spaced in a rectangular, planar lattice at a first side of the AiP. Each antenna element is configured for at least transmitting radio signals having a first polarization, and configured for at least receiving radio signals having a second polarization orthogonal to the first polarization. The AiP is rectangular, and the lattice is shifted towards a first corner of the AiP, such that first and second distances from the lattice to first and second edges, respectively, of the AiP are shorter than third and fourth distances from the lattice to third and fourth edges, respectively, of the AiP. The first and second edges adjoin at the first corner, and the third and fourth edges adjoin at another corner of the AiP diagonally opposite to the first corner.

Within the present disclosure, unless explicitly stated to the contrary, an AiP and a so called "Antenna-on-Package" (AoP) are considered as being equivalent to each other. Thus, in what remains of the description of the present disclosure and in the claims, only the term AiP is used.

With "radio signal", it is meant a signal carried by an electromagnetic wave belonging to the radio frequency spectrums, such as used in e.g. 5G and 6G radio communication networks.

With "antenna element", it is meant an element configured to both radiate electromagnetic waves and to be excited by receiving such electromagnetic waves. Phrased differently, an antenna element is an element configured emit and receive electromagnetic wave in order to transmit and receive radio signals.

With "AiP contacting elements", it is meant e.g. one or more solder islands/pads, using which the AiP can be electrically connected and mounted to e.g. corresponding solder islands/pads on a printed circuit board (PCB) or similar. In some embodiments, the AiP contacting elements can also be provided with solder already, for example in the form of solder balls, and the AiP package can be for example a ball-grid array (BGA) or similar. It is envisaged that the plurality of AiP contacting elements can be internally routed to the one or more ICs. and such that electrical signals may be routed to and from the one or more ICs via the plurality of AiP contacting elements. It is of course also envisaged that there are corresponding signal paths present which connect the one or more ICs internally, such that they may communicate with each other as required, and that there are also corresponding signal paths between the various ICs and the antenna elements.

With "integrated circuits" (ICs), it is meant for example circuitry such as beamforming circuits, low-noise amplifiers, power amplifiers, or similar, which are needed to control the radio signals transmitted and received via the antenna elements.

As will be described in more detail later herein, the present disclosure improves upon already available technology in that various larger array antenna structures can be created using the envisaged AiP as the only required type of building block, for all polarization types. This because the shifted lattice allows to place two such AiPs side by side while still keeping a consistent spacing between all of the combined antenna elements, while still allowing for sufficient area (e.g. below the antenna elements) for also arranging the required ICs and AiP contacting elements. Requiring only a single AiP type can reduce both development efforts, logistic efforts and maintenance efforts.

In one or more embodiments of the AiP, an upper frequency of the radio signals transmitted and received by the antenna elements may correspond to a particular wavelength. An equidistant spacing of the antenna elements may be approximately half of the particular wavelength. As generally used herein, if two things are stated as being equal, it is assumed that this also includes the situations where the two things are “approximately equal”. Likewise, if stated that two things are approximately equal, this does not exclude the two things being exactly equal either. When the two things being exactly equal causes a particular technical effect, it is assumed that the skilled person would know how to interpret “approximately equal”, and know how far from being exactly equal the two things can be while still obtaining a same, or sufficiently same, technical effect.

In one or more embodiments of the AiP, the first and second distances may be measured from centers of the antenna elements along the first and second edge to the first and second edges, respectively. The first and second distances may be less than one fourth of the particular wavelength. In particular, this may enable that when two such AiPs are arranged side by side, the spacing between two neighboring antenna elements located on different AiPs can also be on the order of half of the particular wavelength.

In one or more embodiments of the AiP, at least a majority of the AiP contacting elements may be arranged along the third and fourth edges of the AiP.

In one or more embodiments of the AiP, at least one of the second, third and fourth corner of the rectangular AiP may be slanted. Using one or more slanted corners may e.g. allow to arrange multiple AiPs closer together, and/or e.g. provide an opening for inserting structural underfill (e.g. an adhesive/glue) after the AiPs have been mounted to e.g. a PCB, to further strengthen the mechanical connection between the AiPs and the PCB.

In one or more embodiments of the AiP, one of the first polarization and the second polarization may be directed along the first edge of the AiP.

In one or more embodiments of the AiP, one of the first polarization and the second polarization may be directed at a 45-degree angle with respect to the first edge of the AiP.

According to a second aspect of the present disclosure, an Antenna-in-Package (AiP) pair assembly is provided. The AiP pair assembly includes a first and second AiP according to e.g. the first aspect. The first and second AiPs are arranged side by side with their first sides facing in a same direction. The second AiP is rotated 180 degrees relative to the first AiP, such that a particular edge of the first AiP faces a same particular edge of the second AiP. The particular edge of both the first AiP and of the second AiP is either the first edge or the second edge. The antenna elements of the first AiP along the particular edge of the first AiP are aligned with the antenna elements of the second AiP along the particular edge of the second AiP, such that the antenna elements of both the first and second AiP together form a combined array antenna for transmitting combined (or coherent) radio signals having the first polarization and receiving combined (or coherent) radio signals having the second polarization.

By utilizing the shifted lattice of each AiP, wherein the antenna elements are all shifted towards a first corner of the first and second AiP, respectively, a larger array antenna can be created wherein an equidistant spacing between all antenna elements is possible at least in a direction across both AiPs, at least for the first polarization when transmitting and the second polarization when receiving.

In one or more embodiments of the AiP pair assembly, an upper frequency of the radio signals transmitted and received by the antenna elements of the first AiP may correspond to a particular wavelength. A fifth distance between centers of antenna elements of the first AiP along the particular edge of the first AiP to centers of antenna elements of the second AiP along the particular edge of the second AiP may be approximately half of the particular wavelength.

In one or more embodiments of the AiP pair assembly, the AiP pair assembly may further include a printed circuit board (PCB). The first AiP and the second AiP may both be mounted to the PCB using their respective AiP contacting elements, and with respective second sides, opposite to the first sides, facing towards the PCB.

According to a third aspect of the present disclosure, an Antenna-in-Package (AiP) quartet assembly is provided. The AiP quartet assembly includes a first, second, third and fourth AiP according to e.g. the first aspect. The first, second, third and fourth AiPs are all arranged with their first sides facing in a same direction. The first and second AiPs are arranged side by side and form a first AiP pair assembly, wherein the second AiP is rotated 180 degrees relative to the first AiP, such that a first particular edge of the first AiP faces a same first particular edge of the second AiP. The third and fourth AiPs are arranged side by side and form a second AiP pair assembly, wherein the third AiP is rotated 90 degrees relative to the first AiP (of the first AiP pair assembly), and wherein the fourth AiP is rotated 180 degrees with respect to the third AiP, such that a second particular edge of the third AiP faces a same second particular edge of the fourth AiP. The first particular edge of both the first and second AiPs is the first edge (of the AiP according to e.g. the first aspect), and the second particular edge of both the third and fourth AiPs is the second edge (of the AiP according to e.g. the first aspect). Alternatively, the first particular edge of both the first and second AiPs is the second edge and the second particular edge of both the third and fourth AiPs is the first edge. The antenna elements of the first AiP along the first particular edge of the first AiP are aligned with the antenna elements of the second AiP along the first particular edge of the second AiP, such that the antenna elements of both the first and second AiPs together form a first combined array antenna for transmitting combined (or coherent) radio signals having the first polarization and receiving combined (or coherent) radio signals having the second polarization. The antenna elements of the third AiP along the second particular edge of the third AiP are aligned with the antenna elements of the fourth AiP along the second particular edge of the fourth AiP, such that the antenna elements of both the third and fourth AiPs together form a second combined array antenna for transmitting combined (or coherent) radio signals having the second polarization and receiving combined (or coherent) radio signals having the first polarization.

Once again, by utilizing the shifted lattice of each AiP in the first AiP pair assembly, a larger array antenna can be created wherein an equidistant spacing between antenna elements is possible in a direction across both AiPs of the first AiP pair assembly, at least for the first polarization (when transmitting) and the second polarization (when receiving). In addition, by rotating the AiPs of the second AiP pair assembly as indicated above, an additional larger antenna can be created also for the second AiP pair assembly wherein an equidistant spacing between antenna elements is possible in a direction across both AiPs of the second AiP pair assembly, at least for the second polarization (when transmitting) and the first polarization (when receiving). When combined together, the two AiP pair assemblies of the AiP quartet assembly allows to both transmit and receive radio signals of both the first and second 20 polarizations.

In one or more embodiments of the AiP quartet assembly, an upper frequency of the radio signals transmitted and received by the antenna elements of the first AiP may correspond to a particular wavelength. A sixth distance between centers of antenna elements of the first AiP along the first particular edge of the first AiP to centers of antenna elements of the second AiP along the first particular edge of the second AiP may be approximately half of the particular wavelength. A seventh distance between centers of antenna elements of the third AiP along the second particular edge of the third AiP to centers of antenna elements of the fourth AiP along the second particular edge of the fourth AiP may be approximately half of the particular wavelength.

In one or more embodiments of the AiP quartet assembly, the AiP quartet assembly may further include at least one printed circuit board (PCB). The first, second, third and fourth AiP may be mounted to the at least one PCB using their respective AiP contacting elements, and with respective second sides, opposite to the first sides, facing towards the at least one PCB.

According to a fourth aspect of the present disclosure, an Antenna-in-Package (AiP) multi-assembly is provided. The AiP multi-assembly includes at least a first and second AiP quartet assembly according to e.g. the third aspect.

Utilizing several AiP quartet assemblies can e.g. allow to transmit stronger radio signals, to more effectively beamform such transmitted radio signals, and/or to more effectively receive radio signals. Even though an equidistant spacing between the antenna elements cannot be assured in all directions, the various AiP quartet assemblies can be arranged such that various grating lobes in the antenna pattern, caused by non-equidistant spacing between e.g. two AiP quartet assemblies, can be arranged such that they to a lesser degree affect radio communication in a direction where people are normally distributed and moving (e.g. in a horizontal plane), and such that they to a higher degree affect radio communication in a direction where people are not normally distributed and moving (e.g. in a vertical plane).

In one or more embodiments of the AiP multi-assembly, in each one of the first and second AiP quartet assemblies, the first and second AiP pair assemblies may be arranged next to each other along a first direction. The first and second AiP quartet assemblies may be arranged next to each other along a second direction perpendicular to the first direction. Phrased differently, the AiP pair assemblies may be thus be arranged in a rectangular grid. It may, for example, be envisaged that in the second direction, the AiP quartet assemblies are arranged as close to each other as possible, to minimize the distortion in equidistance between the antenna elements along the second direction.

In one or more embodiments of the AiP multi-assembly, the AiP multi-assembly may further include at least one printed circuit board (PCB). In both the first and second AiP quartet assemblies, all of the first, second, third and fourth AiP may be mounted to the at least one PCB using their respective AiP contacting elements, and with respective second sides, opposite to the first sides, all facing towards the at least one PCB.

According to a fifth aspect of the present disclosure, a method of operating an Antenna-in-Package (AiP) quartet assembly (such as the AiP quartet assembly according to the third aspect), or of operating an AiP multi-assembly (such as the AiP multi-assembly according to the fourth aspect) is provided. The method includes, during a first time slot, using the antenna elements of the first and second AiP pair assemblies of each (or the single) AiP quartet assembly to simultaneously transmit combined (or coherent) radio signals having both the first polarization and the second polarization. The method further includes, during a second time slot different from the first time slot, using the antenna elements of the first and second AiP pair assemblies of each AiP quartet assembly to simultaneously receive combined (or coherent) radio signals having both the first polarization and the second polarization.

According to a sixth aspect of the present disclosure, a network node for a telecommunications network is provided. The network node includes at least one AiP according to the first aspect, at least one AiP pair assembly according to the second aspect, at least one AiP quartet assembly according to the third aspect, and/or at least one AiP multi-assembly according to the fourth aspect.

These and other objects and advantages of the present disclosure will be apparent from the following detailed description, the drawings and the claims. Within the scope of the present disclosure, it is envisaged that all features and advantages described with reference to e.g. the AiP of the first aspect are relevant for, apply to, and may be used in combination with also the various AiP assemblies according to the second, third and fourth aspects, the method according to the fifth aspect, and the network node according to the sixth aspect, and vice versa.

BRIEF DESCRIPTION OF THE DRAWINGS

Exemplifying embodiments will be described below with reference to the accompanying drawings, in which.

Figure 1A:
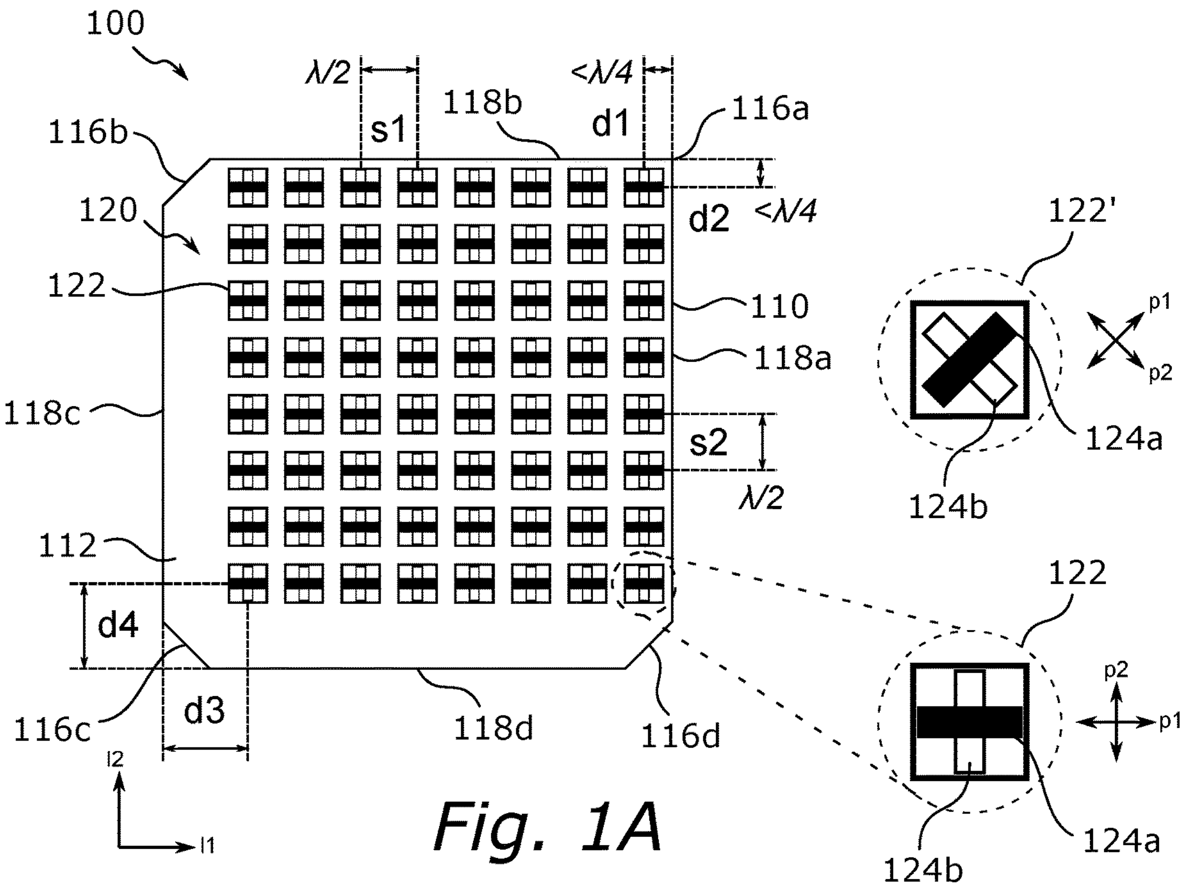
FIGS. 1A and 1B schematically illustrate a top view and a bottom view, respectively, of an embodiment of an AiP according to the present disclosure.

In the drawings, like reference numerals will be used for like elements unless stated otherwise. Unless explicitly stated to the contrary, the drawings show only such elements that are necessary to illustrate the example embodiments, while other elements, in the interest of clarity, may be omitted or merely suggested. As illustrated in the Figures, the sizes (absolute or relative) of elements and regions may be exaggerated or understated vis-à-vis their true values for illustrative purposes and, thus, are provided to illustrate the general structures of the embodiments.

DETAILED DESCRIPTION

Exemplifying embodiments of an Antenna-in-Package (AiP), various assemblies of such AiPs, and a method of operating such an assembly, will now be described more fully hereinafter with reference to the accompanying drawings. The drawings show currently preferred embodiments, but the invention may, however, be embodied in many different forms and should not be construed as limited to the embodiments set forth herein: rather, these embodiments are provided for thoroughness and completeness, and fully convey the scope of the present disclosure to the skilled person.

An embodiment of an AiP according to the present disclosure will now be described with reference to FIGS. 1A and 1B.

FIG. 1A schematically illustrates a top view of an AiP 100. The AiP 100 includes a package 110. On a first side 112 of the package 110, the AiP 100 includes an array antenna 120 which includes a plurality of antenna elements 122. The antenna elements 122 are arranged equidistantly spaced in a rectangular, planar lattice at the first side 112. In this particular example, the lattice is a square lattice such that a spacing s1 between neighboring antenna elements 122 in a first direction 11 is equal to a spacing s2 of the antenna elements 122 in a second direction 12 perpendicular to the first direction 11. Herein. "a spacing" between two antenna elements may for correspond to a center-to-center distance of the two antenna elements.

In the particular example illustrated in FIG. 1A, there is a total of 8×8 antenna elements 122. It is of course envisaged that there may be e.g. fewer than 8×8 antenna elements, or more than 8×8 antenna elements. It is of course also envisaged that there may not necessarily be an equal number of antenna elements in both the first direction 11 and the second direction 12. For example, it is envisaged that there may e.g. be "A×B" antenna elements in total, where the letter A corresponds to the number of antenna elements in the first direction 11, and the letter B corresponds to the number of antenna elements in the second direction 12. Preferably. A equals B, such that there is as many antenna elements 122 in the first direction 11 as in the second direction 12.

The AiP 100 has four edges (i.e. a first edge 118*a*, a second edge 118*b*, a third edge 118*c*, and a fourth edge 118*d*) and four corners (i.e. a first corner 116*a*, a second corner 116*b*, a third corner 116*c*, and a fourth corner 116*d*). The first and second edges 118*a* and 118*b* adjoin at the first corner 116*a*. The second and third edges 118*b* and 118*c* adjoin at the second corner 116*b*. The third and fourth edges 118*c* and 118*d* adjoin at the third corner 116*c*, while the fourth and first edges 118*d* and 118*a* adjoin at the fourth corner 116*d*. Phrased differently, the first and third edges 118*a* and 118*c* are opposite, while the second and fourth edges 118*b* and 118*d* are opposite. The first and third corners 116*a* and 116*c* are diagonally opposite, while the second and fourth corners 116*b* and 116*d* are diagonally opposite.

Importantly, in the envisaged AiP 100, the lattice of antenna elements 122 is shifted towards the first corner 116*a*. This results in a first distance d1 between the first edge 118*a* and the lattice being smaller than an opposite third distance d3 between the third edge 118*c* and the lattice. Similarly, this results in a second distance d2 between the second edge 118*b* and the lattice being smaller than an opposite fourth distance d4 between the fourth edge 118*d* and the lattice. As indicated in FIG. 1A, these distances are measured e.g. perpendicularly from the corresponding edge to a center of an antenna element being arranged along and closest to that corresponding edge.

In the particular example illustrated in FIG. 1A, a spacing s1 between antenna elements 122 in the first direction 11 is equal to half of a particular wavelength λ, while a spacing s2 between antenna elements 122 in the second direction 12 is also equal to half of the particular wavelength λ. As described earlier, this particular wavelength λ may correspond to e.g. an upper frequency of the radio signals which are to be transmitted and received by the antenna elements 122. By arranging the antenna elements 122 spaced (at least approximately) half of the particular wavelength λ, the so formed array antenna 120 may be particularly suitable to both transmit and receive such radio signals.

In the particular example illustrated in FIG. 1A, the distances d1 and d2 are each smaller than one fourth of the particular wavelength λ. As will be described later herein, this allows two such AiPs 100 to be positioned side by side such that a distance (across the gap formed between the two AiPs) between antenna elements arranged along the edges of the two AiPs facing towards each other can be equal to approximately one half of the particular wavelength, taking into account also the (potentially small) gap between the two AiPs.

It may also be envisaged that a desired spacing between the antenna elements (i.e., spacings s1 and s2) may correspond to some other fraction of the particular wavelength λ. For example, a desired spacing may be such that s1 and s2 both equal e.g. one quarter of the particular wavelength λ, or even a full particular wavelength λ. It is envisaged that the distances d1 and d2 may then be adjusted accordingly, such that d1 and d2 are both smaller than one eight of the particular wavelength λ(if s1 and s2 equal one quarter of the particular wavelength λ), or are both smaller than one half of the particular wavelength λ(if s1 and s2 equal one full particular wavelength λ). In general, it is envisaged that if s1 and s2 equals X, d1 and d2 can be adjusted such that d1 and d2 are both equal to, or are slightly smaller than, half of X, such that when two AiPs are arranged side by side, the spacing between antenna elements across the gap formed between the two AiPs is approximately X.

In the particular example illustrated in FIG. 1A, each one of the second, third and fourth corners 116*b*. 116*c* and 116*d* is slanted. In other embodiments, it is envisaged that fewer or even none of these corners are slanted.

Each antenna element 122 is configured to transmit radio signals having a first polarization p1, as indicated by the filled rectangles 124*a* in each antenna element 122. Each antenna element 122 is also configured to receive radio signals having a second polarization p2, as indicated by the empty rectangles 124*b* in each antenna element 122. In some embodiments, for the antenna elements 122, the first polarization may for example align with (or be directed along) the first direction 11, while the second polarization may for example align with (or be directed along) the second direction 12. In other embodiments, for an alternative configuration of antenna elements 122', the first polarization may for example be directed such that it forms a 45-degree angle with the first direction 11 (and with the first edge 118*a*), while the second polarization may for example be directed such that it forms a 45-degree angle with the second direction 12 (and with the second edge 118*b*). Other orientations of the first and second polarizations p1 and p2 with respect to the first and second directions 11 and 12 (and the first and second edges 118*a* and 118*b*) are also envisaged as possible, while preferring that the first and second polarizations p1 and p2 are still (at least approximately) orthogonal to each other.

In all other examples of various embodiments discussed herein, it will be assumed that the first polarization p1 is aligned along the first direction 11, and that the second polarization p2 is aligned along the second direction 12.

Figure 1B:
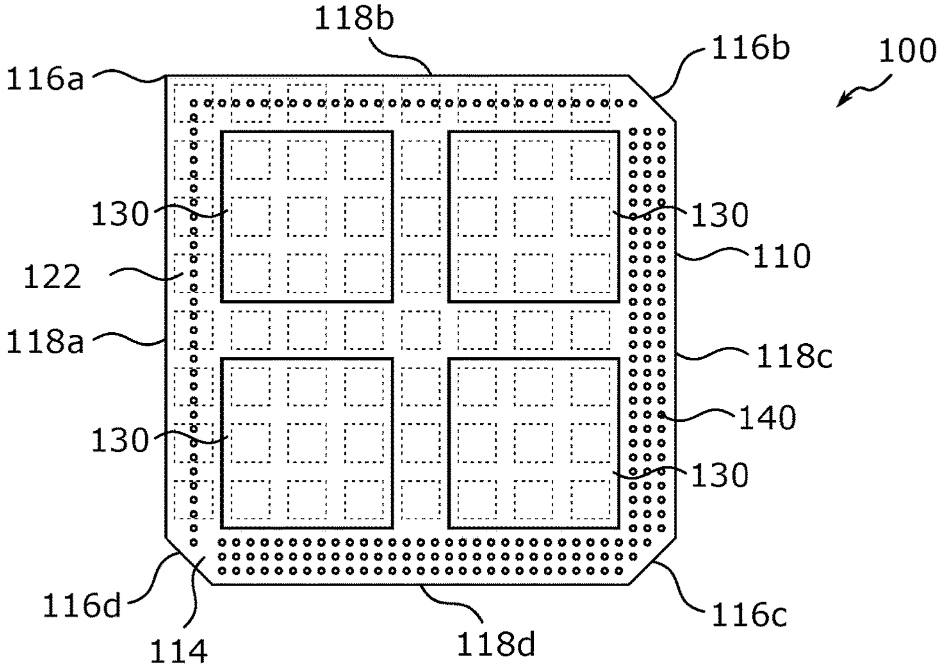

FIG. 1B schematically illustrates a bottom view of the AiP 100, wherein the antenna elements 122 arranged on the first side are shown using dashed lines. On a second side 114 of the AiP 100, opposite to the first side 112 of the AiP 100, there is arranged a plurality of ICs 130. Here. "arranged at the second side 114" means that the various ICs 130 are at least partially exposed at the second side 114. In other embodiments, it is envisaged that the various ICs 130 can instead be completely arranged within the package 110, without any exposure at the second side 114. Exposing one or more of the ICs 130 on the second side 114 may however be preferable, as the ICs 130 can then more efficiently be cooled, which may be important for higher frequencies. Also, it is envisaged that ICs that operate at higher frequency (including e.g. hundreds of GHz) can benefit from being integrated within the AiP 100 such that their signals to/from the antenna elements 122 and between themselves do not need to be routed via e.g. a PCB (which would possibly cause unwanted signal attenuation or similar). Other ICs operating at lower frequencies can instead, if so desired, be positioned as separate components on e.g. a PCB. This reasoning applies to all embodiments discussed herein.

Although the AiP 100 in FIGS. 1A and 1B is illustrated as including four ICs 130, it is of course envisaged also that the AiP 100 may include fewer or more than four ICs, such as for example a single IC, two ICs, five ICs, etc. All the ICs 130 may or may not be ICs of a same type. Examples of ICs may e.g. include beamforming ICs (BFICs) for controlling a shape and/or direction of the radio signals, frequency converters (such as up/down converters. UDCs) for altering a frequency content of the radio signals, low-noise amplifiers (LNAs) and/or power amplifiers (NA) for adjusting a strength of the radio signals, various filters, or other types of ICs such that the various ICs together achieve a desired functionality of the AiP 100.

Along the edges 118*a*-118*d*, the AiP 100 further includes a plurality of AiP contacting elements 140, which are configured to electrically connect the various ICs 130 to e.g. a PCB. The AiP contacting elements may for example be solder pads/lands, and/or be provided with balls of solder (such that the AiP 100 is on the form of a BGA or similar), which may be used to solder the AiP 100 to the PCB. In the particular example illustrated in FIG. 1B, a majority of the AiP contacting elements 140 are arranged along the third and fourth edges 118*c* and 118*d*. In other embodiments, it is envisaged that this must not necessarily be the case, and that there may for example be an equal number of AiP contacting elements 140 along each of the edges 118*a*-118*d*. In other embodiments, there may for example be no AiP contacting elements 140 along one or more (but not all) edges.

In particular, as will be described later herein in more detail, the shifting of the lattice of antenna elements 122 (of the array antenna 120) towards the first corner 116*a* allows two AiPs 100 to be arranged side by side, such that their antenna elements 122 together forms a combined, larger, array antenna and where the spacing between antenna elements 122 can be made at least approximately equidistant in at least one direction across the two AiPs. At the same time, without simultaneously reducing the overall area of the package 110 to match the overall area of the array antenna 120, sufficient area on e.g. the second side 114 will remain for arranging both the AiP contacting elements 140 and ICs 130. This is particularly advantageous for higher frequencies (e.g. >28 GHz), where utilizing only the overall size of the array antenna 120 for fitting all of ICs 130 and the AiP contacting elements 140 would not be sufficient, as the number of antenna elements 122 in each AiP 100 is fixed due to manufacturing constraints (as described in the beginning herein), and as the preferable spacing between antenna elements 122 scales as the inverse of frequency.

A first type of assembly of more than one AiP as envisaged herein will now be described in more detail with reference to FIGS. 2A and 2B.

Figure 2A:
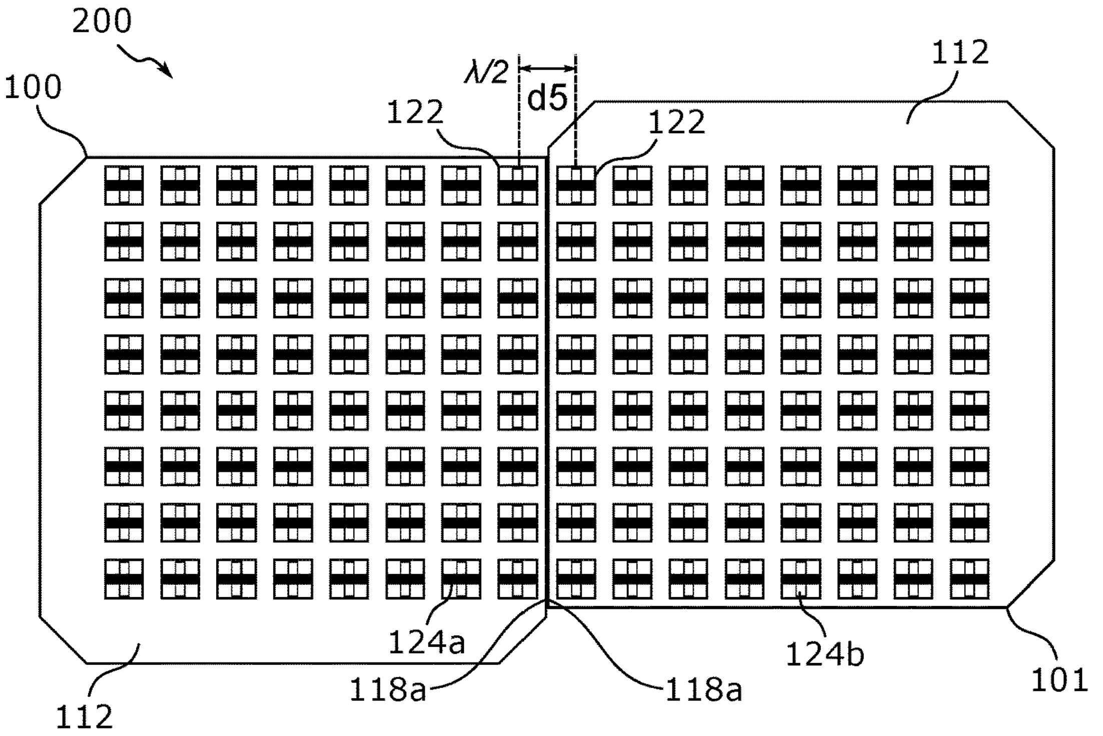
FIGS. 2A and 2B schematically illustrate top views of various embodiments of an AiP pair assembly according to the present disclosure.

FIG. 2A schematically illustrates a top view of an AiP pair assembly 200, including a first AiP 100 and a second AiP 101. Although given different reference numbers, it is envisaged that the first AiP 100 and the second AiP 101 are both an AiP of a same, single type (i.e., they are equal). e.g. the AiP 100 described herein with reference to FIGS. 1A and 1B, and that only their relative orientation differs.

The first and second AiPs 100 and 101 are arranged side by side, with their first sides 112 facing in a same direction. The second AiP 101 is rotated 180 degrees relative to the first AiP 100, such that the first edge 118*a* of the first AiP 100 faces the first edge 118*a* of the second AiP 101.

The antenna elements 122 of the first AiP 100 along the first edge 118*a* of the first AiP 100 are aligned with the antenna elements 122 of the second AiP 101 along the first edge 118*a* of the second AiP 101. The first and second AiPs 100 and 101 are arranged so close together that a spacing/distance d5 between these antenna elements across the (potentially small) gap formed between the two AiPs 100 and 101 is approximately (or equal to) one half of the particular wavelength λ. The spacing/distance d5 is here defined as a center-to-center distance between an antenna element 122 of the first AiP 100 on one side of the gap formed between the first and second AiPs 100 and 101, and a corresponding closest antenna element 122 of the second AiP 101 on the other side of that gap.

Further, as the second AiP 101 is rotated 180 degrees, the antenna elements 122 of the second AiP 101 are still (even when rotated) configured to transmit radio signals in a same polarization as the antenna elements 122 of the first AiP 100. Similarly, the antenna elements 122 of the second AiP 101 are also still configured to receive radio signals in a same polarization as the antenna elements 122 of the first AiP 100. In the particular example illustrated in FIG. 2A, the orientation of the filled rectangles 124*a* indicates that transmission is in the first polarization p1, while the orientation of the empty rectangles 124*b* indicates that receiving is in the second polarization p2. Consequently, together, the first and second AiPs 100 and 101 form a combined array antenna for transmitting combined radio signals having the first polarization, and receiving combined radio signals having the second polarization.

Figure 2B:
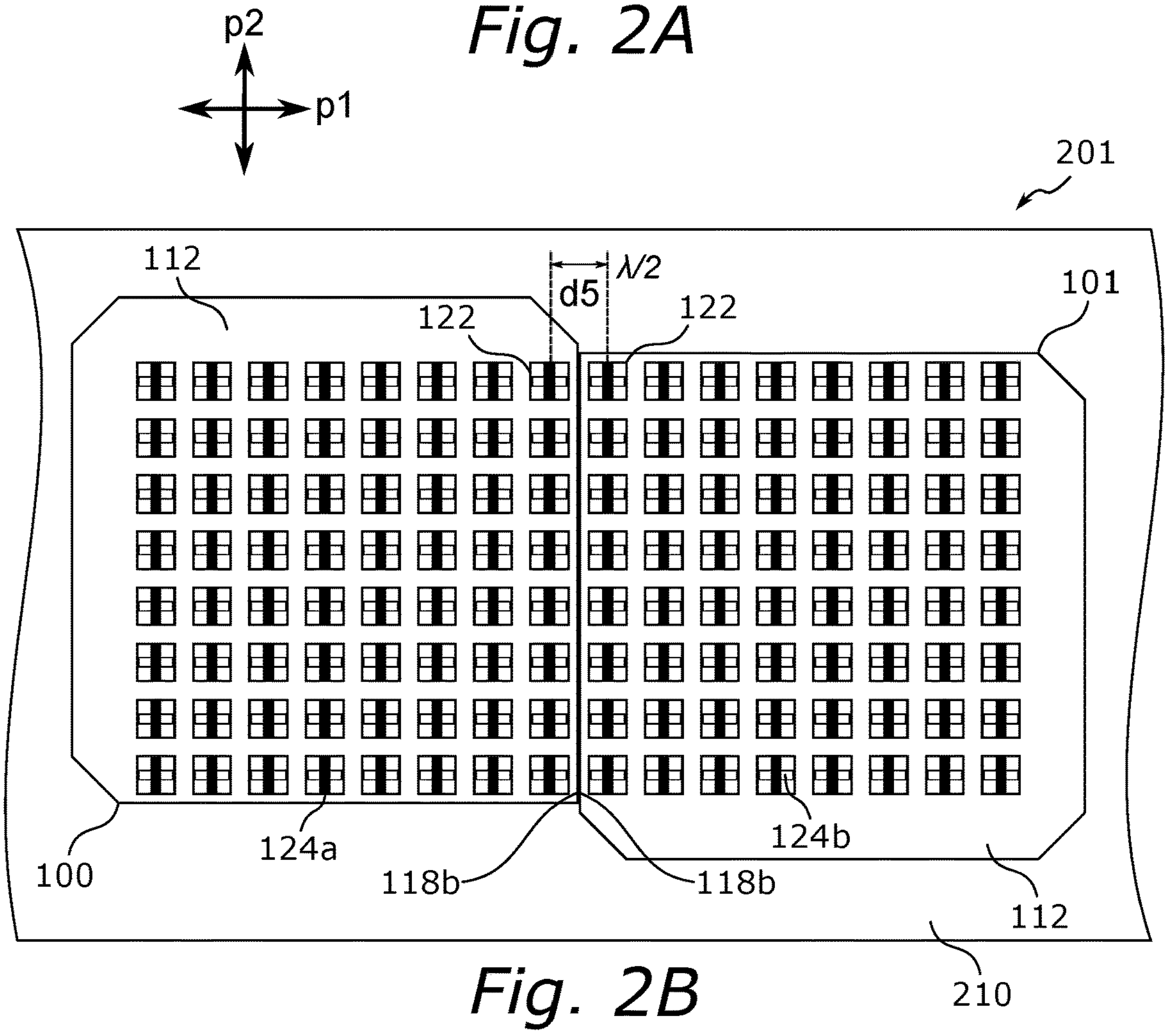

FIG. 2B schematically illustrates a top view of another envisaged AiP pair assembly 201. The AiP pair assembly 201 is equal to the AiP pair assembly 200 illustrated in FIG. 2A, except that the first and second AiPs 100 and 101 are instead arranged such that their respective second edges 118*b* faces towards each other (instead of the respective first edges 118*a*, as in the AiP pair assembly 200 illustrated in FIG. 2A). This has the effect that in the AiP pair assembly 201, transmitting is in the second polarization p2 (as indicated by the orientation of the filled rectangles 124*a*), while receiving is in the first polarization p1 (as indicated by the orientation of the empty rectangles 124*b*). The AiP pair assembly 201 also includes a PCB 210, on which both the first AiP 100 and the second AiP 101 are mounted with their respective second sides, opposite to the first sides 112, facing towards the PCB 210. Of course, such a PCB 210 can also be included in the AiP pair assembly 200 illustrated in FIG. 1A, or be left out from the AiP pair assembly 201.

Both AiP pair assemblies 200 and 201 illustrate how, as envisaged in the present disclosure, two AiPs as described earlier herein can be arranged side by side to create a larger array antenna, wherein an (at least approximately) equidistant spacing between all antenna elements 122 can be provided in at least a direction across both of the two AiPs, even across a gap likely formed between the two AiPs when arranged side by side.

A second type of assembly of more than one AiP as envisaged herein will now be described in more detail with reference to FIGS. 3A and 3B.

Figure 3A:
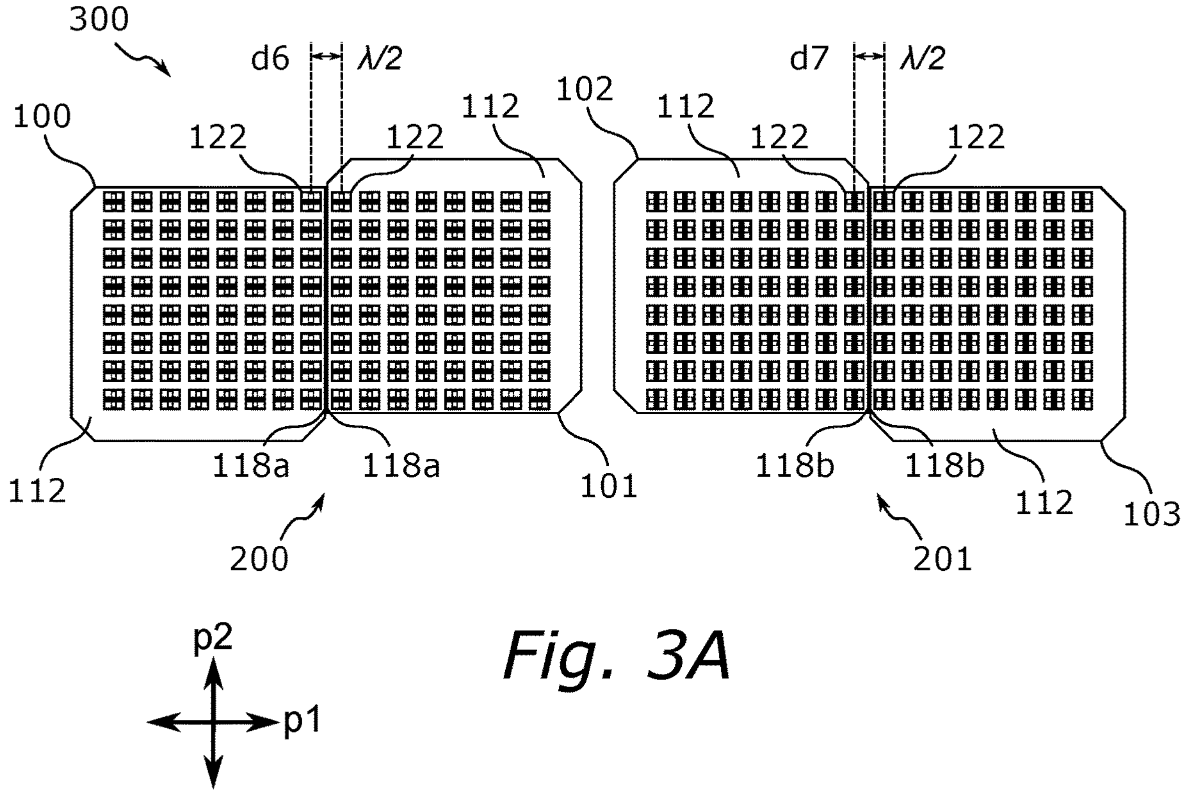
FIGS. 3A and 3B schematically illustrate top views of various embodiments of an AiP quartet assembly according to the present disclosure.

FIG. 3A schematically illustrates a top view of an AiP quartet assembly 300, including a first AiP 100, a second AiP 101, a third AiP 102, and a fourth AiP 103. Each AiP 100-103 is for example an AiP 100 as illustrated in FIGS. 1A and 1B herein. All of the AiPs 100-103 are arranged with their first sides 112 facing in a same direction. The first AiP 100 and the second AiP 101 are arranged side by side and form a first AiP pair assembly 200 (such as e.g. the AiP pair assembly 200 illustrated in FIG. 2A). The second AiP 101 is rotated 180 degrees relative to the first AiP 100, such that the first edge 118*a* of the first AiP 100 faces the first edge 118*a* of the second AiP 101. The third AiP 102 and the fourth AiP 103 are arranged side by side and form a second AiP pair assembly 201 (such as e.g. the AiP pair assembly 201 illustrated in FIG. 2B). The third AiP 102 is rotated 90 degrees relative to the first AiP 100, and the fourth AiP 103 is rotated 180 degrees with respect to the third AiP 102, such that the second edge 118*b* of the third AiP 102 faces the second edge 118*b* of the fourth AiP 103.

In the particular example illustrated in FIG. 3A, the antenna elements 122 of the first AiP 100 along the first edge 118*a* of the first AiP 100 are aligned with the antenna elements 122 of the second AiP 101 along the first edge 118*a* of the second AiP 101, such that the antenna elements 122 of both the first AiP 100 and the second AiP 101 together form a first combined array antenna for transmitting combined radio signals having the first polarization p1 (as indicated by the orientation of the filled rectangles 124*a* of the first AiP 100 and second AiP 101), and for receiving combined radio signals having the second polarization p2 (as indicated by the orientation of the empty rectangles 124*b* of the first AiP 100 and second AiP 101). Likewise, the antenna elements 122 of the third AiP 102 along the second edge 118*b* of the third AiP 102 are aligned with the antenna elements 122 of the fourth AiP 103 along the second edge 118*b* of the fourth AiP 103, such that the antenna elements 122 of both the third AiP 102 and the fourth AiP 103 together form a second combined array antenna for transmitting combined radio signals having the second polarization p2 (as indicated by the orientation of the filled rectangles 124*a* of the third AiP 102 and fourth AiP 103), and for receiving combined radio signals having the first polarization p1 (as indicated by the orientation of the empty rectangles 124*b* of the third AiP 102 and fourth AiP 103).

Figure 3B:
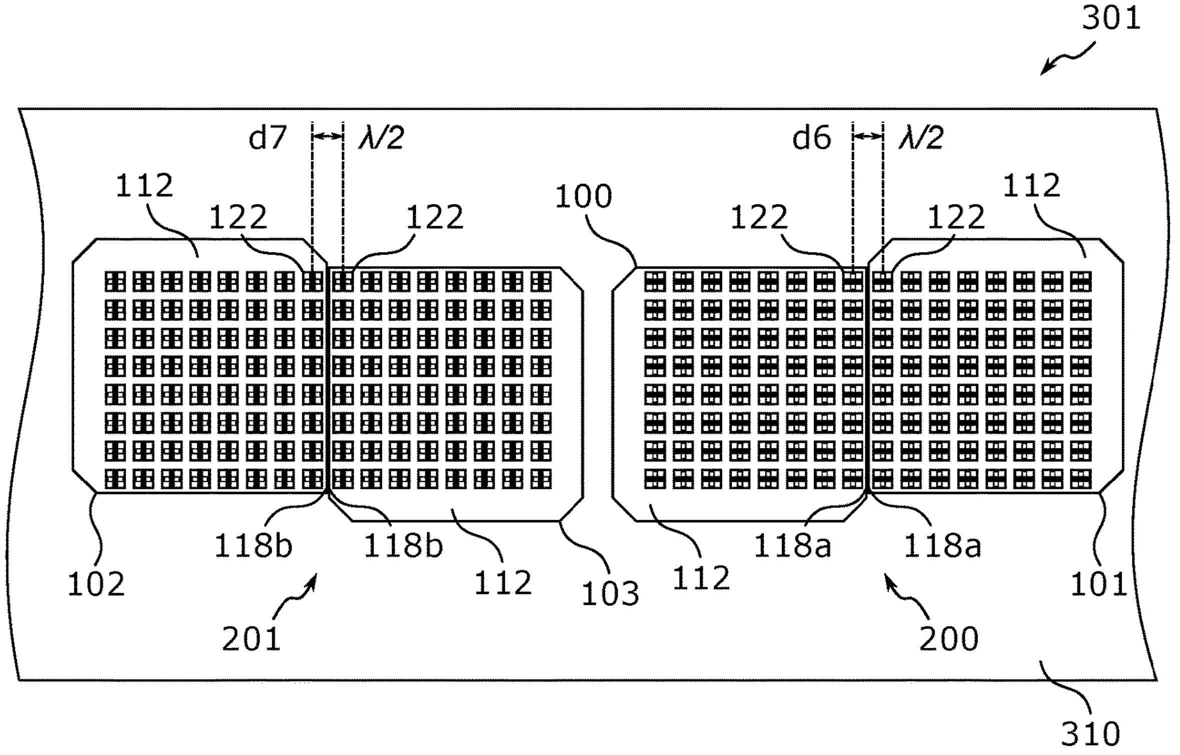

FIG. 3B schematically illustrates a top view of another embodiment of an AiP quartet assembly 301. The AiP quartet assembly 301 is the same as the AiP quartet assembly 300 illustrated in FIG. 3A, except that the positions of the first AiP pair assembly 200 and the second AiP pair assembly 201 are interchanged. Also, the AiP quartet assembly 301 further includes a PCB 310, on which all of the AiPs 100-103 are mounted with their second sides, opposite to the first sides 112, facing towards the PCB 310. The PCB 310 may of course also be included in the AiP quartet assembly 300 illustrated in FIG. 3A, or be left out from the AiP quartet assembly 301. Here, it should be noted that it is not important which one of the two AiP pair assemblies that is named "the first" and "the second", respectively. The important thing is that in one of the two AiP pair assemblies, the first AiP is rotated 90 degrees relative to the first AiP in the other one of the two AiP pair assemblies, etc.

In both of the AiP quartet assemblies 300 and 301, spacings/distances d6 and d7 (as measured center-to-center from one antenna element to the other, as described earlier herein) between a pair of neighboring antenna elements 122 located on both sides of the gap formed between the various AiPs in each AiP pair assembly 200 and 201, respectively, are each approximately half of the particular wavelength λ. Thus, as described earlier herein, each AiP pair 200 and 201 provide a larger array antenna, wherein an equidistance spacing is achieved in at least one direction across both AiPs of a same AiP pair.

The spacing between the first AiP pair assembly 200 and the second AiP pair assembly 201 is preferably selected such that e.g. parallax errors are sufficiently small. This consideration applies also to a misalignment between the first and second AiP pair assemblies 200 and 201 in the direction 12. It is not envisaged to simultaneously use all of the four AiPs 100-103 to transmit (or receive) a single combined radio signal having a single particular polarization. An envisaged use of the AiP quartet assemblies 300 and 301 instead includes using e.g. the first AiP pair assembly 200 to transmit in one polarization and receive in the other polarization, while using the second AiP pair assembly 201 to instead receive in said one polarization and transmit in said other polarization. FIGS. 3A and 3B illustrate how, using the envisaged AiP as the single building block, larger antenna assemblies can be created. In particular. FIGS. 3A and 3B illustrate how, by proper orientation of each AiP 100-103 relative to the other ones, and by arranging the AiPs 100-103 in two pairs 200 and 201 can provide two larger array antennas, wherein one such larger array antenna can transmit and receive in a first and second polarization, respectively, while the other such array antenna can transmit and receive in the second and first polarization, respectively. As will be described later herein with reference to FIGS. 5A and 5B, this allows to use the AiP quartet assemblies 300 and 301 to e.g. first transmit radio signals having both the first and second polarization and, in another time instance, receive radio signals having both the first and second polarization.

For a service area being wider in one direction (e.g. horizontally) than in another direction (e.g. vertically), it can be desirable to have more antenna elements in the narrower direction than in the wider direction, due to e.g. reasons of beam squint. If using e.g. a wide relative bandwidth while steering the beam a lot, the direction of the beam may change along the bandwidth. If having a wide service area is combined with having many elements in a same direction (i.e., a more narrow beam), the beam may not point at e.g. a user equipment for the full bandwidth. For example, assuming a service area of e.g. +/−60 degrees horizontally (or in azimuth), and e.g. +/−30 degrees vertically (or in elevation), a preferable number of antenna elements may e.g. be 16 in the horizontal direction and 32 in the vertical direction, as the service area is twice as wide as it is high. Such an assembly can be obtained by combining multiple AiP quartet assemblies as envisaged herein, as will now be described in more detail with reference to FIG. 4.

Figure 4:
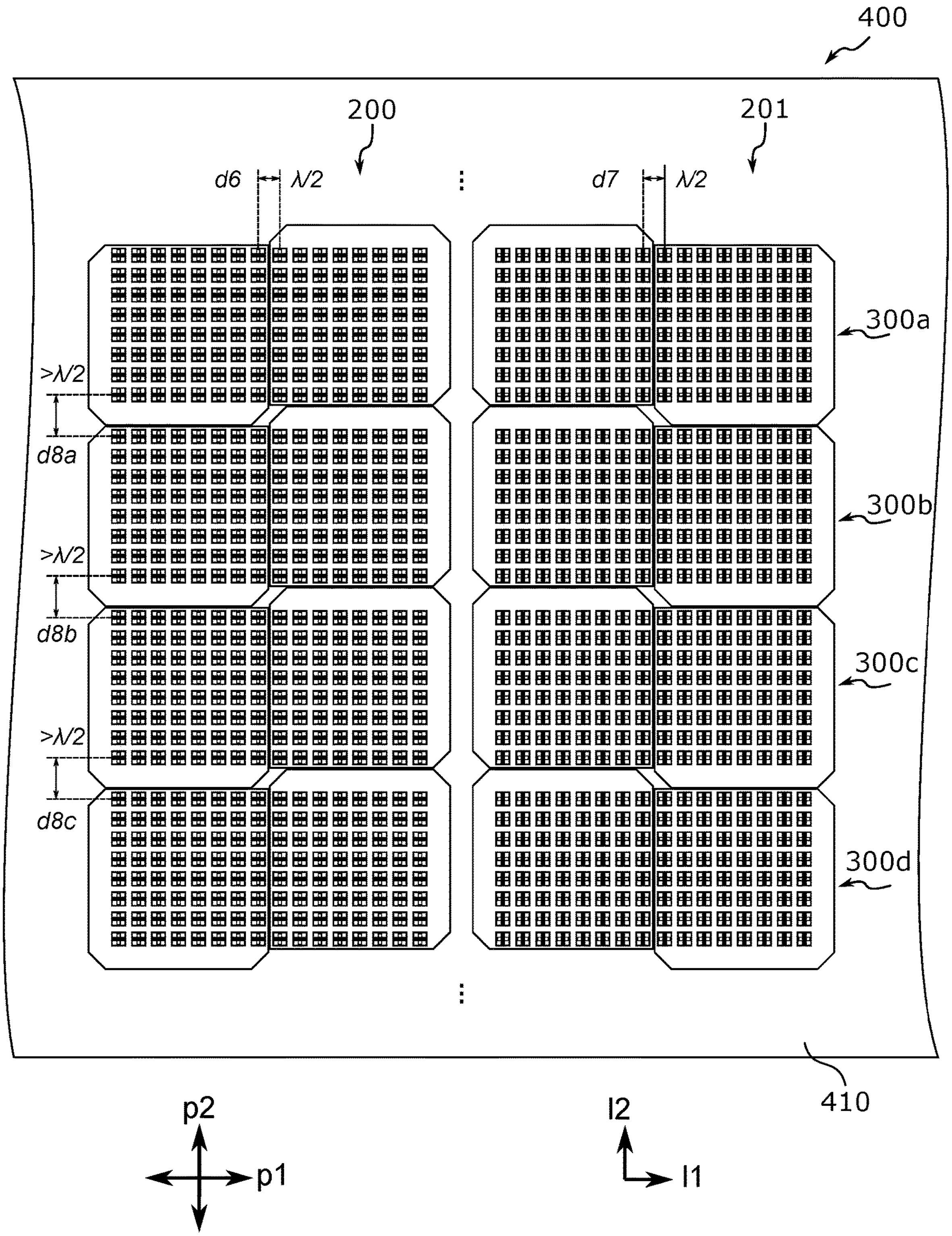
FIG. 4 schematically illustrate a top view of an embodiment of an AiP multi-assembly according to the present disclosure, and FIGS. 5A and 5B schematically illustrate various steps of an embodiment of a method of operating an AiP quartet assembly according to the present disclosure.

FIG. 4 schematically illustrates a top view of an AiP multi-assembly 400, including multiple AiP quartet assemblies 300*a*. 300*b*. 300*c* and 300*d*. The first and second AiP pair assemblies 200 and 201 of each AiP quartet assembly 300*a-d* are arranged next to each other along the first direction 11, while the various AiP quartet assemblies 300*a-d* themselves are arranged next to each other in the second direction 12. Each AiP includes 8×8 antenna elements. Each AiP pair assembly 200 and 201 thus includes a total of 16 antenna elements in the first direction 11. As there are four AiP quartet assemblies 300*a-d* in the second direction, the total number of antenna elements in the second direction 12 is 32, thus providing the desired 16×32 overall array antenna. In fact, as there are two AiP pair assemblies 200 and 201 in each AiP quartet assembly 300*a-d*, there are two such 16×32 array antennas located next to each other in the first direction 11. However, each such 16×32 array antenna will, at each time instance, be used to transmit or receive combined radio signals having a polarization opposite to those of the other 16×32 array antenna.

As illustrated in FIG. 4, the AiPs are tightly spaced in the horizontal/azimuth first direction 11 within each column of AiP pair assemblies 200 and 201, such that the distances/spacings d6 and d7 are approximately half of the particular wavelength λ. However, due to the shape of the envisaged AiP building block on which the lattice of antenna elements is shifted toward the first corner, as illustrated in FIG. 4, the AiPs cannot be arranged such that corresponding distances/separations d8*a*, d8*b* and d8*c* between antenna elements on different AiPs in the second direction 12 are also approximately one half of the particular wavelength λ. Instead, the distances/separations d8*a*, d8*b* and d8*c* will be larger than one half of the particular wavelength λ. Such a separation in the second direction 12 can lead to so called grating lobes in the radiation pattern in the second direction 12. However, as most user equipment are normally placed in a same elevation plane (e.g. on the ground), such grating lobes in the second direction 12 is of less concern than if they would instead appear in the first direction 11 (as users can often be spread out in the horizontal direction). Additionally, if assuming that also the user equipment itself is capable of beamforming, the requirement for having no or few such grating lobes can be even further relaxed. However, it can be preferable to in any case minimize the presence of such grating lobes in the second direction 12 by still keeping the distances/separations d8*a*, d8*b* and d8*c* as close to half of the particular wavelength λ as possible. In the AiP multi-assembly 400 illustrated in FIG. 4, this is achieved by utilizing that in each AiP pair assembly 200 and 201, one of the AiPs is rotated 180 degrees relative to the other, such that in only one of the AiPs in each AiP pair assembly 200 and 201, the major area of the first surface not occupied by any antenna elements is either e.g. to the left and on the bottom, while in the other AiP in the same AiP pair assembly 200 and 201, this major area is instead e.g. to the right and on the top. As illustrated in FIG. 4, this allows to place the AiPs more closely together in the second direction 12 than if e.g. the alignment of the major areas in both of the AiPs in a same AiP pair assembly 200 and 201 would be the same. Here. "left" and "right" means e.g., if looking at FIG. 4, towards the negative and positive first direction 12, respectively. Similarly. "bottom" and "top" then means, if still looking at FIG. 4, towards the negative and positive second direction 12, respectively.

Although FIG. 4 illustrates there being exactly four AiP quartet assemblies 300*a*-300*d*, it is envisaged that an AiP multi-assembly as envisaged herein may have fewer or more AiP quartet assemblies than four. As described earlier herein, the number of AiP quartet assemblies may e.g. be adapted to a desired service area.

Finally, a method of operating e.g. an AiP quartet assembly as e.g. illustrated in FIGS. 3A and 3B, or an AiP multi-assembly as e.g. illustrated in FIG. 4, will now be described in more detail with reference to FIGS. 5A and 5B.

Figure 5A:
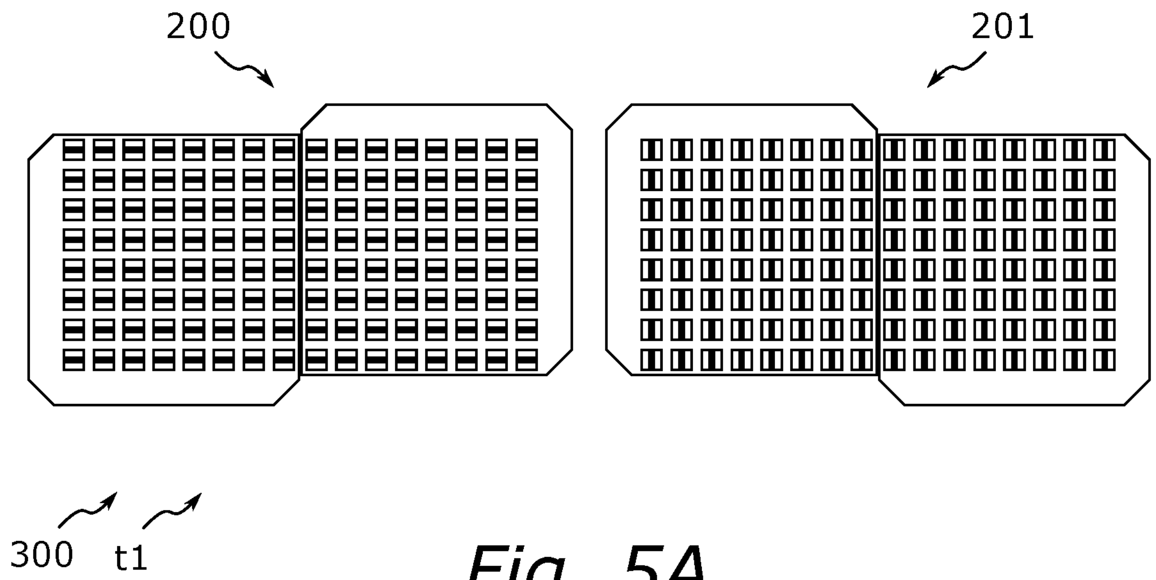

FIG. 5A schematically illustrates a first step of a method of operating an AiP quartet assembly 300. During a first time slot t1, the antenna elements of the first AiP pair assembly 200 and the second AiP pair assembly 201 are all used only to transmit. i.e. to simultaneously transmit combined radio signals having both the first polarization p1 (as indicated by the orientation of the filled rectangles in the first AiP pair assembly 200) and the second polarization p2 (as indicated by the orientation of the filled rectangles in the second AiP pair assembly 201). As there is, during the first time slot t1, only transmission, the empty rectangles are missing from FIG. 5*a*.

Figure 5B:
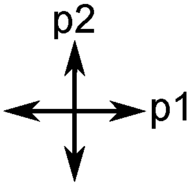
Figure 5B:
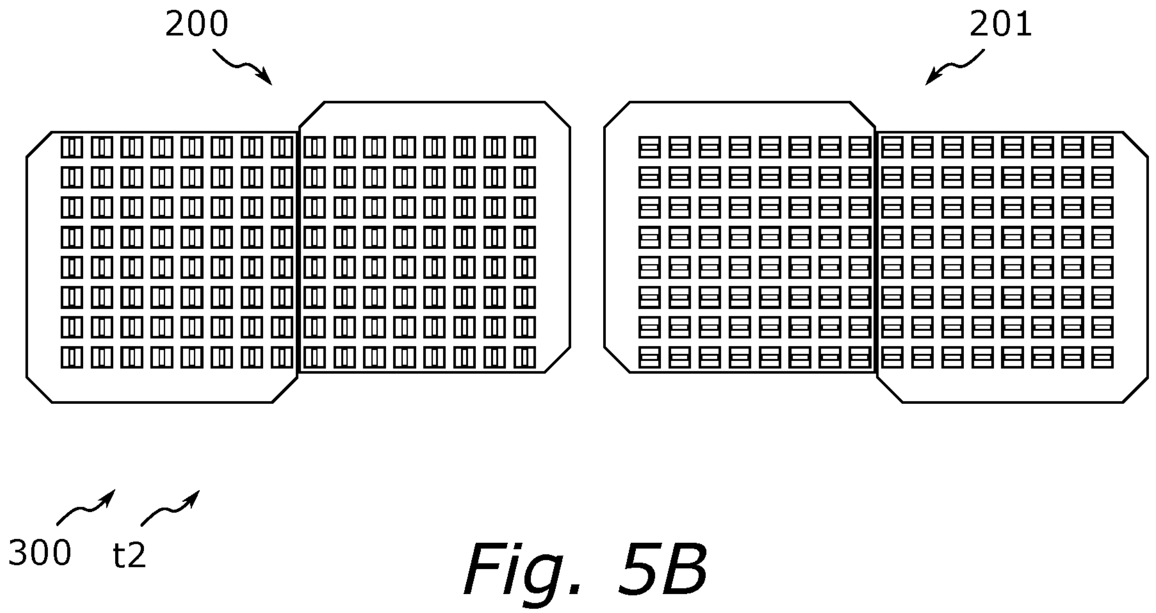

FIG. 5B schematically illustrates a second step of the method. During a second time slot t2 different from the first time slot t1, the antenna elements of the first AiP pair assembly 200 and the second AiP pair assembly 201 are instead used only to receive. i.e. to simultaneously receive combined radio signals having both the first polarization p1 (as indicated by the orientation of the empty rectangles in the second AiP pair assembly 201) and the second polarization p2 (as indicated by the orientation of the empty rectangles in the first AiP pair assembly 200). As there is, during the second time slot t2, only receiving, the filled rectangles are missing from FIG. 5B. The method is also applicable to multiple such AiP quartet assemblies 300, such as found e.g. in an AiP multi-assembly as envisaged herein. In such a case, in each time step, all AiP quartet assemblies can be operated in an equal fashion. e.g. to transmit (or in another time slot, receive) radio signals having both the first polarization p1 and the second polarization p2, but where the presence of multiple AiP quartet assemblies in e.g. the second direction 12 provides more narrow main lobes in the radiation pattern in the second direction 12, which can be desirable in some situations as described earlier herein.

The present disclosure also envisages one or more network nodes for a telecommunications network. The one or more network nodes include at least one AiP, at least one AiP pair assembly, at least one AiP quartet assembly, and/or at least one AiP multi-assembly, as envisaged and described herein with. Herein, examples of such "network nodes" include, but are not limited to, e.g. radio access network nodes, radio base stations, base transceiver stations. Node Bs, evolved Node Bs, gNBs, access points, and e.g. integrated access and backhaul nodes. It may also be envisaged to use the disclosed AiP, and/or the assemblies thereof, in e.g. one or more so called "terminal devices", examples of which include, but are not limited to, user equipment, wireless devices, mobile stations, mobile phones, handsets, wireless local loop phones, smartphones, laptop computers, tablet computers, network equipped sensors, network equipped vehicles, and so-called Internet of Things devices.

As the method described above illustrates, and in summary of the envisaged solution offered by the present disclosure, the envisaged AiP can be used as a single-type building block to create more elaborate AiP assemblies. In particular, an AiP quartet assembly can be provided, using four AiPs of a same type but oriented differently with respect to each other in the particular way described herein. During use of for example time-division multiplexing (TDD), the envisaged AiP quartet assembly can be used to, in different time slots, simultaneously send (or receive) radio signals having multiple polarizations. As each AiP is configured (i.e. hardwired) to transmit in one polarization and receive in the other polarization, no internal antenna switches are required in order to use a single antenna element for both sending and receiving in a same polarization, and the negative effects (in terms of generated heat, required build volume, etc.) of such antenna switches can thus be avoided. Instead, the effect of sending and receiving in different polarizations is obtained by rotating the AiPs relative to each other. Also, by using only AiPs of a single-type AiP as envisaged herein (although with different orientations), flexible and powerful antenna assemblies can be created without incurring additional efforts in terms of development, logistics and maintenance, especially as only a single type of AiP needs to be designed, manufactured and kept in stock in order to build the various AiP assemblies. Finally, it should be mentioned once again that the shifting of the lattice of antenna elements towards a corner of the AiP allows to combine two such AiPs to form a larger array antenna, having an equidistant spacing between all antenna elements at least in a first direction across both AiPs. By not also reducing the overall size of the AiP package such that it matches only the overall area of the array antenna, sufficient area and volume is available to integrate all of the needed ICs and AiP contacting elements within the same package.

Although features and elements may be described above in particular combinations, each feature or element may be used alone without the other features and elements or in various combinations with or without other features and elements.

Additionally, variations to the disclosed embodiments may be understood and effected by the skilled person in practicing the claimed invention, from a study of the drawings, the disclosure, and the appended claims. In the claims, the words "comprising" and "including" does not exclude other elements, and the indefinite article "a" or "an" does not exclude a plurality. The mere fact that certain features are recited in mutually different dependent claims does not indicate that a combination of these features cannot be used to advantage.

LIST OF REFERENCE NUMERALS

100-103 Antenna-in-Package (AiP)
110 package
112 first side
114 second side
116*a-d* corner
118*a-d* edge
120 array antenna
122, 122' antenna element
124*a* transmitting antenna element
124*b* receiving antenna element
130 integrated circuit (IC)
140 AiP contacting element
200, 201 AiP pair assembly
210, 310, 410 printed circuit board (PCB)
300, 301 AiP quartet assembly
300*a-d* AiP quartet assembly
400 AiP multi-assembly
11 first direction
12 second direction
p1 first polarization
p2 second polarization
s1, s2 spacing between antenna elements on same AiP
d1-d4 spacing between array antenna lattice and edge
d5-d7 spacing between antenna elements on different AiPs in same AiP pair assembly
d8*a*-d8*c* spacing between antenna elements on different AiPs in different AiP quartet assemblies
λ particular wavelength
t1, t2 time slot

The invention claimed is:

1. An Antenna-in-Package (AiP), comprising:
an array antenna comprising a plurality of antenna elements configured for transmitting and receiving radio signals;
one or more integrated circuits (ICs) configured for controlling the radio signals, and
a plurality of AiP contacting elements electrically connected to the one or more ICs, wherein
the antenna elements are arranged equidistantly spaced in a rectangular, planar lattice at a first side of the AiP,
each antenna element is configured for at least transmitting radio signals having a first polarization, and configured for at least receiving radio signals having a second polarization orthogonal to the first polarization,
the AiP is rectangular and the lattice is shifted towards a first corner of the AiP, such that first and second distances from the lattice to first and second edges of the AiP are shorter than third and fourth distances from the lattice to third and fourth edges of the AiP, wherein the first and second edges adjoin at the first corner, and wherein the third and fourth edges adjoin at another corner of the AiP diagonally opposite to the first corner,
the first distance is measured from centers of the antenna elements along the first edge to the first edge,
the second distance is measured from centers of the antenna elements along the second edge to the second edge,
the first distance is less than one fourth of a particular wavelength, and
the second distance is less than one fourth of the particular wavelength.

2. The AiP according to claim 1, wherein an upper frequency of the radio signals transmitted and received by the antenna elements corresponds to the particular wavelength, and wherein an equidistant spacing of the antenna elements is approximately half of the particular wavelength.

3. The AiP according to claim 1, wherein at least a majority of the AiP contacting elements are arranged along the third and fourth edges of the AiP.

4. The AiP according to claim 1, wherein at least one of the second, third and fourth corner of the rectangular AiP is slanted.

5. The AiP according to claim 1, wherein one of the first polarization and the second polarization is directed along the first edge of the AiP.

6. The AiP according to claim 1, wherein one of the first polarization and the second polarization is directed at a 45-degree angle with respect to the first edge of the AiP.

7. An Antenna-in-Package (AiP) pair assembly, comprising a first and second AiP according to claim 1, wherein
the first and second AiP are arranged side by side with their first sides facing in a same direction,
the second AiP is rotated 180 degrees relative to the first AiP, such that a particular edge of the first AiP faces a same particular edge of the second AiP, where the particular edge of both the first AiP and of the second AiP is either the first edge or the second edge, and the antenna elements of the first AiP along the particular edge of the first AiP are aligned with the antenna elements of the second AiP along the particular edge of the second AiP, such that the antenna elements of both the first and second AiP together form a combined array antenna for transmitting combined radio signals having the first polarization and receiving combined radio signals having the second polarization.

8. The AiP pair assembly according to claim 7, wherein an upper frequency of the radio signals transmitted and received by the antenna elements of the first AiP corresponds to the particular wavelength, and wherein a fifth distance between centers of antenna elements of the first AiP along the particular edge of the first AiP to centers of antenna elements of the second AiP along the particular edge of the second AiP is approximately half of the particular wavelength.

9. The AiP pair assembly according to claim 7, further comprising a printed circuit board (PCB), wherein the first AiP and the second AiP are both mounted to the PCB using their respective AiP contacting elements, and with respective second sides, opposite to the first sides, facing towards the PCB.

10. An Antenna-in-Package (AiP) quartet assembly, comprising a first, second, third and fourth AiP according to claim 1, wherein the first, second, third and fourth AiP are all arranged with their first sides facing in a same direction, the first and second AiP are arranged side by side and form a first AiP pair assembly, wherein the second AiP is rotated 180 degrees relative to the first AiP, such that a first particular edge of the first AiP faces a same first particular edge of the second AiP, the third and fourth AiP are arranged side by side and form a second AiP pair assembly, wherein the third AiP is rotated 90 degrees relative to the first AiP, and wherein the fourth AiP is rotated 180 degrees with respect to the third AiP, such that a second particular edge of the third AiP faces a same second particular edge of the fourth AiP, the first particular edge of both the first and second AiP is the first edge and the second particular edge of both the third and fourth AiP is the second edge, or the first particular edge of both the first and second AiP is the second edge and the second particular edge of both the third and fourth AiP is the first edge, the antenna elements of the first AiP along the first particular edge of the first AiP are aligned with the antenna elements of the second AiP along the first particular edge of the second AiP, such that the antenna elements of both the first and second AiP together form a first combined array antenna for transmitting combined radio signals having the first polarization and receiving combined radio signals having the second polarization, and the antenna elements of the third AiP along the second particular edge of the third AiP are aligned with the antenna elements of the fourth AiP along the second particular edge of the fourth AiP, such that the antenna elements of both the third and fourth AiP together form a second combined array antenna for transmitting combined radio signals having the second polarization and receiving combined radio signals having the first polarization.

11. The AiP quartet assembly according to claim 10, wherein an upper frequency of the radio signals transmitted and received by the antenna elements of the first AiP corresponds to the particular wavelength, a sixth distance between centers of antenna elements of the first AiP along the first particular edge of the first AiP to centers of antenna elements of the second AiP along the first particular edge of the second AiP is approximately half of the particular wavelength, and a seventh distance between centers of antenna elements of the third AiP along the second particular edge of the third AiP to centers of antenna elements of the fourth AiP along the second particular edge of the fourth AiP is approximately half of the particular wavelength.

12. The AiP quartet assembly according to claim 10, further comprising at least one printed circuit board (PCB), wherein the first, second, third and fourth AiP are mounted to the at least one PCB using their respective AiP contacting elements, and with respective second sides, opposite to the first sides, facing towards the at least one PCB.

13. An Antenna-in-Package (AiP) multi-assembly, wherein the AiP multi-assembly comprises:

at least a first and second AiP quartet assembly according to claim 11.

14. The AiP multi-assembly according to claim 13, wherein, in each one of the first and second AiP quartet assemblies, the first and second AiP pair assemblies are arranged next to each other along a first direction, and wherein the first and second AiP quartet assemblies are arranged next to each other along a second direction perpendicular to the first direction.

15. The AiP multi-assembly according to claim 13, further comprising at least one printed circuit board (PCB), wherein, in both the first and second AiP quartet assemblies, all of the first, second, third and fourth AiP are mounted to the at least one PCB using their respective AiP contacting elements, and with respective second sides, opposite to the first sides, all facing towards the at least one PCB.

16. A method of operating an Antenna-in-Package (AiP) quartet assembly, wherein the AiP quartet assembly comprises:

a first, second, third and fourth AiP according to claim 1, wherein the first, second, third and fourth AiP are all arranged with their first sides facing in a same direction, the first and second AiP are arranged side by side and form a first AiP pair assembly, wherein the second AiP is rotated 180 degrees relative to the first AiP, such that a first particular edge of the first AiP faces a same first particular edge of the second AiP, the third and fourth AiP are arranged side by side and form a second AiP pair assembly, wherein the third AiP is rotated 90 degrees relative to the first AiP, and wherein the fourth AiP is rotated 180 degrees with respect to the third AiP, such that a second particular edge of the third AiP faces a same second particular edge of the fourth AiP, the first particular edge of both the first and second AiP is the first edge and the second particular edge of both the third and fourth AiP is the second edge, or the first particular edge of both the first and second AiP is the second edge and the second particular edge of both the third and fourth AiP is the first edge, the antenna elements of the first AiP along the first particular edge of the first AiP are aligned with the antenna elements of the second AiP along the first particular edge of the second AiP, such that the antenna elements of both the first and second AiP together form a first combined array antenna for transmitting combined radio signals having the first polarization and receiving combined radio signals having the second polarization, and the antenna elements of the third AiP along the second particular edge of the third AiP are aligned with the antenna elements of the fourth AiP along the second particular edge of the fourth AiP, such that the antenna elements of both the third and fourth AiP together form a second combined array antenna for transmitting combined radio signals having the second polarization and receiving combined radio signals having the first polarization, and the method comprises:

during a first time slot, using the antenna elements of the first and second AiP pair assemblies of each AiP quartet assembly to simultaneously transmit combined radio signals having both the first polarization and the second polarization, and during a second time slot different from the first time slot, using the antenna elements of the first and second AiP pair assemblies of each AiP quartet assembly to simultaneously receive combined radio signals having both the first polarization and the second polarization.

17. A network node for a telecommunication network, the network node comprising an Antenna-in-Package according to claim 1.

* * * * *